US005741383A

United States Patent [19]
Kneisel

[11] Patent Number: 5,741,383
[45] Date of Patent: Apr. 21, 1998

[54] PROCESS FOR BONDING A VEHICLE WINDOW

[75] Inventor: Andrew R. Kneisel, Royal Oak, Mich.

[73] Assignee: Essex Specialty Products, Inc., Clifton, N.J.

[21] Appl. No.: 931,737

[22] Filed: Aug. 18, 1992

[51] Int. Cl.$^6$ .................... B60J 1/00; E06B 3/00; E06B 5/00; E06B 7/00

[52] U.S. Cl. ............... 156/108; 156/344; 427/155; 427/272; 427/282; 427/304

[58] Field of Search .................... 156/344, 108; 427/259, 272, 282, 304, 154, 155; 118/505, 504

[56] References Cited

U.S. PATENT DOCUMENTS

| | | | |
|---|---|---|---|
| 3,574,024 | 4/1971 | Rose | 156/108 |
| 4,125,088 | 11/1978 | Hong et al. | 118/504 X |
| 4,525,511 | 6/1985 | Kirby et al. | 524/158 |
| 4,643,794 | 2/1987 | Saracsan et al. | 156/310 |
| 4,853,055 | 8/1989 | Taylor | 156/108 |
| 4,871,585 | 10/1989 | Kano et al. | 427/304 X |
| 4,877,652 | 10/1989 | Sparling, II et al. | 427/264 |
| 4,886,704 | 12/1989 | Kamada et al. | 428/323 |
| 5,021,482 | 6/1991 | Wozniak | 524/100 |

FOREIGN PATENT DOCUMENTS

431239A1  6/1991  European Pat. Off. .

Primary Examiner—David A. Simmons
Assistant Examiner—Paul M. Rivard
Attorney, Agent, or Firm—Ann Galbraith; Norman Sims

[57] ABSTRACT

This invention relates to a process for bonding a vehicle window to a vehicle flange comprising the sequential steps of:

a) applying a liquid masking composition to a vehicle flange, b) painting the vehicle, and drying or curing the liquid masking composition sufficiently to form a strippable mask;

c) removing the mask from the flange; and d) adhesively bonding the vehicle window to the vehicle flange. Such a masking process advantageously eliminates the need for the use of solvent-based primers normally used to prime a painted vehicle flange, and provides a mask which is more easily applied and removed from the flange than masking means which initially comprise a solid substance.

20 Claims, No Drawings

PROCESS FOR BONDING A VEHICLE WINDOW

BACKGROUND OF THE INVENTION

This invention relates to processes for installing vehicle windows and, more specifically, to processes for installing a vehicle window through the use of an adhesive.

It is known to mount vehicle windows in a vehicle through the use of an adhesive such as, for example, a moisture-curable urethane adhesive. In such a mounting procedure, the edge of the window is glued to a flange of a vehicle body opening. This procedure usually takes place after the vehicle body, including the flange to which the window is to be adhered to, has been coated with several coats of vehicle paint. Since many commercial urethane adhesives will not provide sufficient adhesion when applied directly to the painted substrate, it is usually necessary to first apply a primer to the painted surface. Such primers typically comprise a solution of a film-forming resin, such as a polyester resin, plus other components to enhance the strength of the adhesion between flange, primer, urethane adhesive, and vehicle window. For example U.S. Pat. No. 4,525,511 describes a primer comprising a film-forming resin and a strong acid. U.S. Pat. No. 4,643,794 describes a primer comprising 10–20 parts polyester resin, 4–5 parts polyisocyanate crosslinking agent, 3–9 parts carbon black, and 66–83 parts volatile solvent. Such primers are applied directly to the painted vehicle flange, prior to bonding the window to the flange with a urethane adhesive.

However, the use of such a solvent-based primer may result in the release into the assembly plant of a level a volatile organic compounds (VOCs) which is more than is desired. In addition, the use of such primers typically result in some degree of misapplication of the primer, wherein the primer is accidentally dripped on to or applied to another painted surface of the vehicle, which may necessitate the "repair" of that part of the vehicle paint. Such paint repairs are costly and undesirable.

It is also known to bond vehicle windows by first masking the flange before the vehicle is painted by the application of a solid pressure sensitive adhesive tape with a pressure sensitive adhesive on one side thereof, which is then removed after the vehicle is painted but before the vehicle window is adhesively bonded to the vehicle flange. However, this method is relatively labor intensive, and is not effectively automatable since the tape must be pressed to the flange over the entire area of the tape in order to cause the pressure sensitive adhesive to wet the flange sufficiently to prevent any vehicle paint from going underneath the tape during the vehicle painting operations. In addition, the tape is difficult to apply in such a manner so that any gaps in the flange near vehicle joints are effectively sealed from the application of the vehicle paint. In addition, the pressure sensitive adhesive on the tape often leaves a residue after removal which may impair the adhesive strength between the vehicle window and the flange and often tears easily during its removal from the flange, making it difficult to remove. Such tape must be removed from the flange fairly soon after its application (usually within one hour), in order to minimize the effect of these disadvantages. Further, such tape may provide an even less effective mask when used through two painting and paint curing operations, which typically comprise applying a "primer/surfacer" paint coating, curing the paint at a temperature of about 325° F., applying a colored paint coating, and curing the paint at a temperature of about 250° F., since such processes may cause the edges of the tape to curl, tear more easily upon removal from the flange, and leave more residue on the flange after removal.

It is also known to bond vehicle windows by first masking the flange before the vehicle is painted by placing a solid template in the shape of the vehicle flange against the flange. However, such a process is not effective in preventing paint overspray from going underneath the template and onto the flange, which reduces the adhesion between the window and the flange when they are subsequently bonded.

It would be desirable to provide a method for installing vehicle windows which does not require the use of a paint primer, and which does not possess the disadvantages of a process which employs a pressure sensitive adhesive masking tape.

SUMMARY OF THE INVENTION

In one aspect, this invention is a process for bonding a vehicle window to a vehicle flange comprising the sequential steps of:

a) applying a liquid masking composition to a vehicle flange, b) painting the vehicle, and drying or curing the masking composition sufficiently to form a removable mask;

c) removing the mask from the flange; and d) adhesively bonding the vehicle window to the vehicle flange.

In a second aspect, this invention is a process for bonding a vehicle window to a vehicle flange comprising the sequential steps of:

a) applying a liquid masking composition to a vehicle flange;

b) painting the vehicle with a coat of a first paint composition, drying or curing the liquid masking composition sufficiently to form a removable mask, and drying or curing the first paint composition;

c) painting the vehicle with a coat of a second paint composition;

d) removing the mask from the flange; and e) adhesively bonding the vehicle window to the vehicle flange.

This invention provides a process by which a vehicle window may be bonded to a vehicle flange without the use of primers, or a solid masking tape. The invention also provides a process which utilizes less organic solvent than a process wherein a solvent-based paint primer is used, which advantageously results in little or no VOCs being emitted into the vehicle manufacturing plant. Further, the process of the invention advantageously provides a more effective mask than a solid masking tape through two painting and paint curing operations, which typically comprise applying a "primer/surfacer" paint coating, curing the paint at a temperature of about 325° F., applying a colored paint coating, and curing the paint at a temperature of about 250° F. Further, when the flange comprises an oily metal substrate, the masking composition has also been discovered to remove at least a portion of the oil residue on the flange when it is removed from the flange, thereby increasing the adhesion, including the lap shear strength, of the bond between the vehicle window and the flange, when the window is subsequently bonded to the flange.

DETAILED DESCRIPTION OF THE INVENTION

Suitable liquid masking compositions include any organic-based composition which will form a mask which may be physically removed by stripping, upon drying or curing of the composition. In order to be strippable, the resulting film has a cohesive strength which is greater than the adhesive strength of the film to the flange, preferably such that the mask may be physically stripped from the flange without tearing apart at the flange/mask interface during the stripping operation. Preferably, the adhesive strength of the resulting mask is also low enough to allow it to be removed easily following the painting of the vehicle. Examples of suitable compositions include those which contain organic compounds, oligomers, or polymers which are dissolved or dispersed in a carrier, and which form a film upon the evaporation or vaporization of the carrier, by agglomeration or fusion of the dissolved or dispersed particles, or by the polymerization of one or more of the components. Examples of such materials include polyvinyl chloride, styrene-butadiene copolymers, acrylic resins, and urethane resins. While certain materials may be preferred for their technical characteristics, or for not needing an organic carrier (e.g., a water-based styrene-butadiene material), polyvinyl chloride is most preferred for cost reasons.

When the polymer is a polyvinyl chloride (PVC) resin, it is preferably of a type which will fuse with a plasticizer and harden at the temperature at which the paint is cured in step (b) of the process of the invention. For example, when the paint is to be baked at a temperature of about 250° F., the PVC resin is preferably a copolymer of PVC and 4.2 percent by weight vinyl acetate, sold as Formulon™ 40 by Formosa Chemicals. When a paint primer/surfacer coat is applied which is baked at a temperature of about 325° F. is used, the PVC resin may be a resin which fuses more slowly, such as a relatively higher molecular weight "pure" PVC resin, available as Formulon™ KV-2 from Formosa Chemicals.

The masking composition may also contain viscosity and sag control additives if necessary. The masking composition should have a viscosity low enough to allow the composition to be applied to the flange easily, yet have a sag resistance sufficient to allow the film composition to be applied thick enough to be removed easily after it is cured, yet remain in a substantially vertical or semi-vertical position on the flange before the composition is dried or cured into a film. Preferably, the intrinsic viscosity of the composition is in the range of from about 2–2.8. In addition, it may also be preferable to use a composition which will dry or cure at the temperature at which the vehicle paint is dried or cured, since the masking composition is applied before the vehicle is painted, as described below.

Suitable solvents and plasticizers for use in preparing the composition include any viscosity-reducing agent for the particular material which may be applied as a liquid at ambient conditions, and which evaporates or fuses into the composition at ambient or elevated temperatures. For example, water may be used as a carrier for styrene-butadiene resins. Plasticizers, such as phthalates, adipates, azelates, sebalates, benzoates, trimellitates, phosphates, polyesters, or polyepoxides may be used as a viscosity-reducing agent for polyvinyl chloride resins. Preferably, the plasticizer is diallyl phthalate, dioctyl phthalate, dibutyl phthalate, tricresyl phosphate, or dioctyl adipate, and is most preferably diallyl phthalate. Other viscosity and rheology control agents and fillers may also be used in the masking composition, such as calcium carbonate, precipitated calcium carbonate and mineral spirits. Preferably, the composition contains at least about 2 to 20 percent by weight of a precipitated calcium carbonate such as Winnofil SPT, available from ICI Chemical Company since the finer particle size of such calcium carbonates provides enhanced sag resistance.

The masking composition may be of any suitable thickness sufficient to allow to be easily removed after it is cured, but is preferably of a thickness in the range of from 0.005 to 0.05 inch. The masking composition may be applied to the vehicle flange in step (a) of the process of the invention by any suitable means such as brushing, extrusion, or spraying, and may be applied either manually or robotically. If the vehicle is to be coated with a rust-resistant coating composition (such as by electrodeposition means), the masking composition is preferably applied after the application and drying of such coating, and is formulated so that it will not strongly adhere to such coating after it is cured, so that it will not significantly damage the rust-resistant coating upon removal. Polyvinyl chloride compositions have been discovered to be suitable masking compositions for this purpose. When a PVC resin masking composition is employed, it preferably comprises about 30 parts by weight plasticizer, 30 parts by weight PVC, and 35–40 parts by weight fillers, plus any other additives necessary to give the composition the desired adhesive and rheology characteristics.

Following the application of the masking composition, the vehicle may be painted with a coat of any suitable paint composition by any suitable means, such as spraying, for example, in step (b) of the processes of the invention, and in step (c) of the process of the second aspect of the invention. Examples of suitable paint compositions include those available from PPG for automotive applications, such as PPG's URC 1000 clear coat, HBAL 9264 Basecoat and 6518 primer/surfacer. The masking composition is also dried or cured sufficiently to form a strippable mask by any suitable means, depending on the particular chemistry employed in the masking composition. For example, the masking composition may dry at ambient conditions, or may require the use of elevated temperatures to facilitate the curing or drying. Preferably, the masking composition will dry or cure at the temperature of the oven used to cure the paint which is applied to the vehicle subsequent to the application of the masking composition in step (a). The masking composition may be cured either prior to or after the painting of the vehicle. However, if the masking composition cures at an elevated temperature, it is preferable to mask and paint the vehicle, and then cure the paint and the masking composition in a single step, in order to avoid having to cure the paint and masking composition at elevated temperatures in separate steps.

If it is necessary to apply and cure more than one layer of paint, as may be the case in situations wherein a "primer/surfacer" layer of paint is to be applied and cured before the application and curing of a color coat layer of paint as in the process of the second aspect of the invention, the masking composition may be applied before the application of the first layer or second layer of paint, and then cured at an elevated temperature. While the mask may be cured at anytime before or throughout the process of applying and curing the paint, if the mask is to be applied before the application of the first layer of paint, it is preferably cured simultaneously with the curing of that paint layer. Typically, a "primer/surfacer" first paint composition layer will be cured at a temperature of about 325° F., and the second paint composition layer, such as a base/clear color coat layer will be cured at a temperature of about 250° F. The term "paint composition" used herein does not include rust-resistant coating compositions applied by electrodeposition means.

After the masking composition is dried or cured, it is then physically removed from the vehicle flange. This may be accomplished by manually or robotically cutting the mask in a direction about perpendicular to the edge of the flange, preferably with a knife or sharp edge, or by pulling on a tab or other piece of material extending outward from the flange which had been placed on the flange prior to the application of the mask, and stripping the mask from the flange to provide a flange surface which is sufficiently free of mask, paint and primer/surfacer to enable the flange to bond to the vehicle window through the use of an adhesive. Preferably, the tab method is used so that any electrodeposition coating previously applied to the flange will not be damaged. The mask may be removed from the vehicle before or after the top layer of paint has completely cured or hardened.

In step (d) of the process of the first aspect of the invention, and step (e) of the process of the second aspect of the invention, the vehicle window is adhesively bonded to the vehicle flange. The vehicle window may be of any suitable size or dimensions and may be comprised of any suitable material, such as glass or a polymeric material, such as polycarbonate. Preferably, the window is comprised of glass on the surface which is to be bonded to the flange. In addition, it is also preferable to apply a layer of black ceramic frit or a layer of black enamel along the edge of the window on the surface which is to be bonded to the flange, to provide protection from ultraviolet rays for the adhesive if such protection is needed as in the case of a urethane adhesive. It may also be preferable to apply a layer of a silane glass primer or "wipe", and/or a layer of a glass primer, which is preferably black, along the edge of the window on the surface which is to be bonded to the flange, to increase the adhesion of the window to the flange, and/or, in the case of a black primer, to provide additional protection from ultraviolet rays for the adhesive if an adhesive which needs such protection is used.

Adhesives suitable for use in bonding the vehicle window to the vehicle flange include any adhesive which will effectively bond such substrates together. Preferably, the adhesive is a one-part urethane adhesive with excess isocyanate groups, which will cure in the presence of atmospheric moisture. Most preferably, the adhesive is a "fast cure"-type adhesive, prepared from a urethane prepolymer having an isocyanate functionality between 2.3 and 3.0 and a catalyst comprising either dimorpholinodiethyl ether or a mixture of organic tin and organic bismuth, as described in U.S. Pat. Nos. 4,758,648 and 4,284,751, which are hereby incorporated by reference in their entirety.

The vehicle window may be bonded to the vehicle flange by either applying an adhesive to the window and bringing the adhesive into contact with the flange, or by applying the adhesive to the flange first. The adhesive may be deposited on the flange or window by any suitable means, such as adhesive extruders or dispensers commonly used in the application of urethane adhesives for vehicle window bonding applications. The bead of adhesive should be sufficient in size to effectively bond the vehicle window to a vehicle window flange. If the bead is applied to the vehicle window, it is applied along at least a portion of the edge of the window, but is preferably applied around its entire periphery. Once the adhesive is applied to the flange or window, the window is installed in such a manner to provide contact between the adhesive and the flange and the adhesive and the windows, either manually, or by robotic means. The adhesive is then allowed to cure.

In another aspect, this invention comprises a process for masking the vehicle flange after the application of a coat of a first paint composition, but prior to the application of a second paint composition, utilizing the masking composition described above, which comprises the following steps:

a) painting the vehicle with a coat of a first paint composition, and drying or curing the first paint composition;

b) applying a liquid masking composition to a vehicle flange;

c) painting the vehicle with a coat of a second paint composition, drying or curing the liquid masking composition sufficiently to form a removable mask, and drying or curing the second paint composition;

d) removing the mask from the flange; and e) adhesively bonding the vehicle window to the vehicle flange.

Preferably, an acid-based paint primer as described, for example in U.S. Pat. No. 5,115,086, is applied to the dried or cured layer of paint following step (d) and prior to step (e). Otherwise, the elements of the process are the same as described above as suitable for use in the processes of the first and second aspects of the invention.

While the use of a liquid masking composition has been discovered to be useful in processes for the bonding of vehicle windows, it may also be useful in any adhesive bonding process wherein a paint or coating is contacted with a surface of a substrate to be bonded, and the paint or coating interferes with the subsequent bonding or adhesion of the substrate, such as in the manufacture of appliances, for example.

ILLUSTRATIVE EMBODIMENTS

The following examples are given to illustrate the invention and should not be interpreted as limiting it in any way. Unless stated otherwise, all parts and percentages are given by weight.

EXAMPLE 1

A PVC resin composition is prepared by mixing at ambient conditions the following components: 30 parts mixed normal alkyl phthalate plasticizer (available as PX 316 from Aristech Chemical Company), 30 parts of a PVC vinyl acetate copolymer dispersion resin (available as Oxy 0565 from Occidental Chemical Company), 36 parts calcium carbonate, (available as Wingdale White from Georgia Marble Company), 3 parts precipitated calcium carbonate, (available as Winnofil SPT from ICI Chemical Company), and 2 parts odorless mineral spirits.

The PVC resin formulation is applied to the flange of a vehicle window opening (which has been previously coated with a layer of an electrodeposition coating) in a thickness of about 0.02 inches and a width of about 1 inch. The vehicle is painted with a base coat and clear coat (HBAL 9264 and URC 1000, respectively, available from PPG and baked at 250° F., for about 30 min. The cured PVC resin mask is then stripped from the vehicle flange. A moisture-curable polyurethane adhesive is applied to a vehicle window, and the window is installed in the vehicle window opening so that the adhesive contacts the portion of the flange from which the PVC mask was stripped. The adhesive is then allowed to cure. The adhesive bond has a lap shear strength of at least about 500 psi.

EXAMPLE 2

A PVC resin composition is prepared by mixing at ambient conditions the following components: 30 parts mixed normal $C_6$—$C_8$—$C_{10}$ alkyl phthalate plasticizer (available as PX 316 from Aristech Chemical Company), 30 parts of a PVC/vinyl acetate copolymer dispersion resin, (available as OXY Formulon 0565-from Formosa Chemical Company), 37 parts calcium carbonate, (available as Wingdale White from Georgia Marble Company), 3 parts precipitated calcium carbonate, (available as Winnofil SPT from ICI Chemical Company), and 2 parts odorless mineral spirits.

The PVC resin is applied to the flange of a vehicle window opening (which has been previously coated with a layer of an electrodeposition coating) in a thickness of about 0.02 inch and a width of about 1 inch. The vehicle is painted with a primer paint coat (PPG 6518 Taupe primer, available from PPG), and baked at a temperature of about 325° F. for about 30 min. The vehicle is then painted with a base coat (HBAL 9264, available from PPG) and clear coat (URC 1000, available from PPG) and baked at 250° F. for about 30 min. The cured PVC resin mask is then stripped from the vehicle flange. A moisture-curable polyurethane adhesive is applied to a vehicle window, and the window is installed in the vehicle window opening so that the adhesive contacts the portion of the flange from which the PVC mask was stripped. The adhesive is then allowed to cure. The adhesive bond has a lap shear strength of at least about 500 psi.

What is claimed is:

1. A process for bonding a vehicle window to a vehicle flange comprising the sequential steps of:
    a) applying a liquid masking composition to a vehicle flange;
    b) painting the vehicle, and drying or curing the liquid masking composition sufficiently to form a removable mask;
    c) removing the mask from the flange; and
    d) adhesively bonding the vehicle window to the vehicle flange.

2. The process of claim 1 wherein the liquid masking composition is cured at a temperature of at least about 250° F.

3. The process of claim 1 wherein the liquid masking composition is cured at a temperature of at least about 325° F.

4. The process of claim 1 wherein the liquid masking composition is applied to the flange in a thickness in the range of from 0.005 to 0.05 inch.

5. The process of claim 1 wherein the vehicle flange comprises a metal substrate.

6. The process of claim 1 wherein the vehicle flange comprises a plastic substrate.

7. The process of claim 5 wherein the vehicle flange additionally comprises a layer of a rust-resistant coating which has been applied to the metal substrate by electrodeposition means.

8. The process of claim 1 wherein the vehicle is painted prior to drying or curing the masking composition sufficiently to form a removable mask.

9. The process of claim 1 wherein the paint composition is dried or cured prior to removing the mask from the flange.

10. A process for bonding a vehicle window to a vehicle flange comprising the sequential steps of:
    a) applying a liquid masking composition to a vehicle flange;
    b) painting the vehicle with a coat of a first paint composition, drying or curing the liquid masking composition sufficiently to form a removable mask, and drying or curing the first paint composition;
    c) painting the vehicle with a coat of a second paint composition;
    d) removing the mask from the flange; and
    e) adhesively bonding the vehicle window to the vehicle flange.

11. The process of claim 10 wherein the liquid masking composition is cured at a temperature of at least about 250° F.

12. The process of claim 10 wherein the liquid masking composition is cured at a temperature of at least about 325° F.

13. The process of claim 10 wherein the liquid masking composition is applied to the flange in a thickness in the range of from 0.005 to 0.05 inch.

14. The process of claim 10 wherein the vehicle flange comprises a metal substrate.

15. The process of claim 10 wherein the vehicle flange comprises a plastic substrate.

16. The process of claim 14 wherein the vehicle flange additionally comprises a layer of a rust-resistant coating which has been applied to the metal substrate by electrodeposition means.

17. The process of claim 10 wherein the vehicle is painted prior to drying or curing the masking composition sufficiently to form a removable mask.

18. The process of claim 10 wherein the paint composition is dried or cured prior to removing the mask from the flange.

19. A process for bonding a vehicle window to a vehicle flange comprising the sequential steps of:
    a) painting the vehicle with a coat of a first paint composition, and drying or curing the first paint composition;
    b) applying a liquid masking composition to a vehicle flange;
    c) painting the vehicle with a coat of a second paint composition, drying or curing the liquid masking composition sufficiently to form a removable mask, and drying or curing the second paint composition;
    d) removing the mask from the flange; and
    e) adhesively bonding the vehicle window to the vehicle flange.

20. The process of claim 19 wherein the vehicle is painted prior to drying or curing the masking composition sufficiently to form a removable mask.

* * * * *